United States Patent
Mezaael (10) Patent No.: US 10,486,591 B1
(45) Date of Patent: Nov. 26, 2019

(54) FLEET ALERT SYSTEM

(71) Applicant: Ford Global Technologies, LLC, Dearborn, MI (US)

(72) Inventor: Abraham Mezaael, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/249,487

(22) Filed: Jan. 16, 2019

(51) Int. Cl.
| | |
|---|---|
| *G06F 17/10* | (2006.01) |
| *B60Q 9/00* | (2006.01) |
| *H04W 4/44* | (2018.01) |
| *H04W 4/021* | (2018.01) |
| *B60R 1/00* | (2006.01) |

(52) U.S. Cl.
CPC .............. *B60Q 9/00* (2013.01); *H04W 4/021* (2013.01); *H04W 4/44* (2018.02); *B60R 1/00* (2013.01)

(58) Field of Classification Search
CPC .......... B60Q 9/00; H04W 4/44; H04W 4/021; B60R 1/00
See application file for complete search history.

(56) References Cited

U.S. PATENT DOCUMENTS

| | | | | |
|---|---|---|---|---|
| 7,388,475 B2 * | 6/2008 | Litkouhi | ............ | B60G 17/0195 340/425.5 |
| 7,460,940 B2 * | 12/2008 | Larsson | ................. | A61B 3/113 180/272 |
| 8,354,932 B2 * | 1/2013 | Schmitz | ................ | G01S 13/931 180/167 |
| 9,146,898 B2 | 9/2015 | Ihlenburg et al. | | |
| 9,922,567 B2 | 3/2018 | Molin et al. | | |
| 2012/0221216 A1 * | 8/2012 | Chauncey | ............. | B60W 40/09 701/51 |
| 2015/0314783 A1 * | 11/2015 | Nespolo | ............ | B60W 30/0953 701/301 |
| 2017/0011562 A1 | 1/2017 | Hodges | | |

* cited by examiner

*Primary Examiner* — Munear T Akki
(74) *Attorney, Agent, or Firm* — Jennifer M. Stec; Brooks Kushman P.C.

(57) ABSTRACT

A vehicle includes a controller programmed to responsive to detecting a predefined event indicative of a hazardous condition, adjust a threshold for an alert corresponding to the event based on one or more entries related to an operation of the vehicle and associated with the event; and responsive to adjusting the threshold, output the alert in a method corresponding to the threshold as adjusted.

18 Claims, 6 Drawing Sheets

FLEET ALERT SYSTEM

TECHNICAL FIELD

The present disclosure is generally related to a vehicle alert system. More specifically, the present disclosure is related to a vehicle system for adjusting alert output.

BACKGROUND

Many vehicles are provided with driving assistance system which generates and outputs an audio or video alert when a driving event is detected. For instance, an audio alert may be output via a speaker of a vehicle when a potential hazardous driving activity such as a harsh-braking or harsh-acceleration above a predefined threshold is detected by the vehicle system. Currently, most driving assistance system outputs the alerts indiscriminately when a predefined threshold is met without considering factors such as the vehicle performance, road conditions, and/or driver experience.

SUMMARY

In one or more illustrative embodiment of the present disclosure, a vehicle includes a controller programmed to responsive to detecting a predefined event indicative of a hazardous condition, adjust a threshold for an alert corresponding to the event based on one or more entries related to an operation of the vehicle and associated with the event; and responsive to adjusting the threshold, output the alert in a method corresponding to the threshold as adjusted.

In one or more illustrative embodiment of the present disclosure, a device connected to a network of a vehicle includes a processor, programmed to responsive to detecting a predefined event indicative of a hazardous condition via a signal received from the network, adjust a threshold for an alert corresponding to the event based on one or more entries related to an operation of the vehicle and associated with the event; and responsive to adjusting the threshold, output the alert in a method corresponding to the threshold as adjusted, wherein the one or more entries include at least one of a driver score entry, or an event intent by user entry.

In one or more illustrative embodiment of the present disclosure, a method for a vehicle includes detecting a predefined event indicative of a hazardous condition via a signal received from one or more vehicle sensors, adjusting a threshold for an alert corresponding to the event based on one or more entries related to an operation of the vehicle and associated with the event; and outputting the alert in a method corresponding to the threshold as adjusted, wherein the one or more entries include at least one of: a vehicle type entry, a driver score entry, a road driving type entry, a configuration value check entry, an event intent by user entry, a vehicle occupancy entry, or a destination purpose entry.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The present disclosure, among other things, proposes a system for controlling in-vehicle alerts. More specifically, the present disclosure proposes a system for adjusting in-vehicle alerts for vehicles based on various factors.

Figure 1:
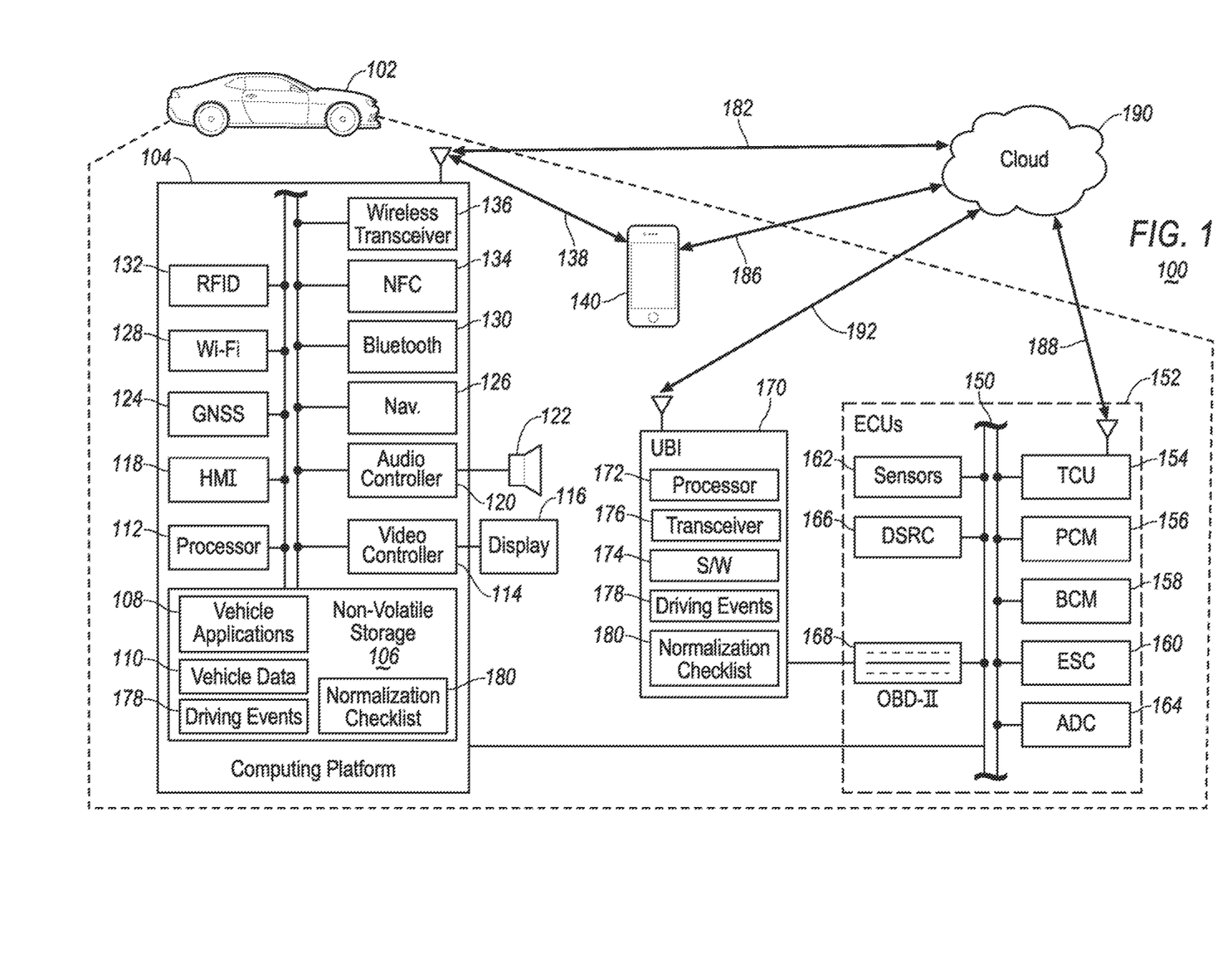
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be battery electric vehicle (BEV), a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 112 configured to perform instructions, commands, and other routines in support of the processes described herein. For instance, the computing platform 104 may be configured to execute instructions of vehicle applications 108 to provide features such as navigation, driving event detecting, vehicle alerts, and wireless communications. Such instructions and other data may be maintained in a non-volatile manner using a variety of types of computer-readable storage medium 106. The computer-readable medium 106 (also referred to as a processor-readable medium or storage) includes any non-transitory medium (e.g., tangible medium) that participates in providing instructions or other data that may be read by the processor 112 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 118 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 116 configured to provide visual output to vehicle occupants by way of a video controller 114. In some cases, the display 116 may be a touch screen further configured to receive user touch input via the video controller 114, while in other cases the display 116 may be a display only, without touch input capabilities. The display 116 may include a head-up display (HUD) configured to provide visual output to vehicle users by projecting an video image onto a surface e.g. the windshield of the vehicle 102. The computing platform 104 may also drive or otherwise communicate with one or more speakers 122 configured to provide audio output to vehicle occupants by way of an audio controller 120.

The computing platform 104 may also be provided with navigation and route planning features through a navigation controller 126 configured to calculate navigation routes responsive to user input via e.g., the HMI controls 118, and output planned routes and instructions via the speaker 122 and the display 116. Location data that is needed for navigation may be collected from a global navigation satellite system (GNSS) controller 124 configured to communicate with multiple satellites and calculate the location of the vehicle 102. The GNSS controller may be configured to support various current and/or future global or regional location systems such as global positioning system (GPS), Galileo, Beidou, Global Navigation Satellite System (GLONASS) and the like. Map data used for route planning may be stored in the storage 106 as a part of the vehicle data 110. Navigation software may be stored in the storage 106 e.g. as one of the vehicle applications 108.

The computing platform 104 may be configured to wirelessly communicate with a mobile device 140 of the vehicle users/occupants via a wireless connection 138 through a wireless transceiver 136. The mobile device 140 may be any of various types of portable computing device, such as cellular phones, tablet computers, smart watches, laptop computers, portable music players, or other device capable of communication with the computing platform 104. The wireless transceiver 136 may be in communication with a Wi-Fi controller 128, a Bluetooth controller 130, a radio-frequency identification (RFID) controller 132, a near-field communication (NFC) controller 134, and other controllers such as a Zigbee transceiver, an IrDA transceiver (not shown), and configured to communicate with a compatible wireless transceiver (not shown) of the mobile device 140.

The computing platform 104 may be further configured to communicate various electronic control units (ECUs) 152 via one or more in-vehicle network 150. The in-vehicle network 150 may include, but is not limited to, one or more of a controller area network (CAN), an Ethernet network, and a media-oriented system transport (MOST), as some examples.

The ECUs 152 may include a telematics control unit (TCU) 154 configured to control telecommunication between vehicle 102 and a cloud 190 through a wireless connection 188 using a modem (not shown). Additionally or alternatively, the computing platform 104 may be configured to communicate with the cloud 190 via the mobile device 140 through a wireless connection 186. The computing platform 104 may be further configured to directly communicate with the cloud 190 via the wireless transceiver 136 using compatible protocols through a wireless connection 182. The cloud 190 may include one or more servers, or computers connected via various types of wired or wireless networks. It is noted that the term cloud is used as a general term throughout the present disclosure and may refer to any cloud-based services involving multiple servers, computers, devices and the like.

The ECUs 152 may further include a powertrain control module (PCM) 156 configured to monitor and control the powertrain operation of the vehicle 102. For instance, the PCM 156 may be configured to the stop/start of an engine (not shown), and/or the driving mode (e.g. economic, normal, or sport) of the vehicle 102. The ECUs 152 may further include a body control module (BCM) 156 configured to monitor and control body operations of the vehicle 102. For instance, the BCM 156 may be configured to control and monitor body functions such as door lock/unlock, seatbelt warning, vehicle occupancy, vehicle lights, blind spot monitoring or the like using signals detected via one or more sensors 162. The sensors 162 may include any electronic, mechanical, magnetic, optical sensors or the like configured to communicate with various ECUs 152 to provide sensing signals. As a few non-limiting examples, the sensors 162 may include a gravitational sensor (g-sensor) configured to measure a gravitational force such as acceleration, deceleration and cornering, a seatbelt latch sensor configured to detect seatbelt fasten status, a vehicle speed sensor configured to measure vehicle speed, a vehicle proximity sensor configured to measure a distance between the vehicle 102 and an object, a camera sensor configured to take image or video outside or inside the vehicle 102, one or more temperature sensors configured to measure an ambient and/or cabin temperature of the vehicle 102, and a vehicle fuel level sensor configured to measure fuel level of the vehicle 102.

The ECUs 152 may further include an electronic stability controls (ESC) 160 configured to monitor vehicle operation status using signals from the speed sensor 162 and control the stability of the vehicle operation whenever needed such as by activating anti-lock brakes (ABS), traction controls or the like. The ECUs 152 may further include an autonomous driving controller (ADC) 164 configured to monitor and control the autonomous driving features of the vehicle 102. Some autonomous driving feature may include lane keep assist, safe distance from other vehicles, cruise control, hands-off-wheel alert, autobraking, brake mitigation with multiple sensitivity levels or the like. The ECUs 152 may further include a dedicated short range communication (DSRC) controller 166 configured to wirelessly communicate with compatible controllers of other vehicles or digital entities (not shown).

The vehicle 102 may be further provided with a usage-based insurance (UBI) device 166 connected to the in-vehicle network 150 via a connecting port such as an OBD-II connector 168 configured to communicate with various ECUs 152 of the vehicle 102 and collect data therefrom. The UBI device 170 may be provided with a processor 172 configured to execute commands and instructions of software 174 to perform various operations including analyzing data received from the in-vehicle network 150 and providing through the speaker 122 and/or the display 116 responsive to detecting a driving event 178. Details of the driving event 178 are discussed below with reference to FIG. 2. The driving event 178 may be stored locally within the UBI device 170. Additionally or alternatively, the driving event 178 may be stored in the storage 106 of the computing platform 104. The UBI device 170 may be further configured to adjust the alert output for one or more driving events 178 based on a normalization checklist 180 stored locally in the UBI device 170 or stored in the storage 106. Details of the normalization checklist are discussed below with reference to FIG. 3. The UBI device 170 may be further provided with wireless communication capability via a wireless transceiver 176 configured to communicate with the cloud via a wireless connection 192. The utilization of the UBI device 170 may be optional and the same function or operations may be performed by the computing platform 104 with software as one of the vehicle applications 108 without having the UBI device 170 connected to the in-vehicle network 150.

Figure 2:
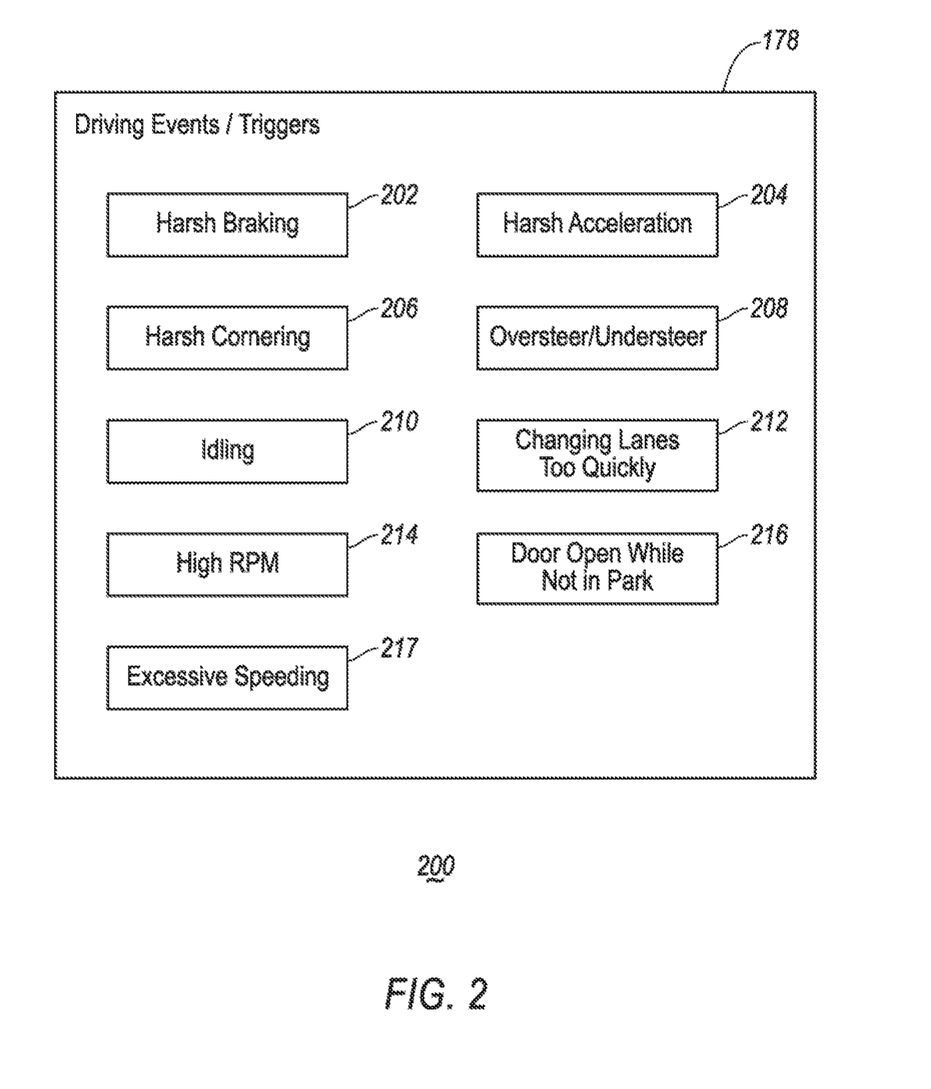
FIG. 2 illustrates an example diagram for driving events of one embodiment of the present disclosure.

Referring to FIG. 2, an example diagram 200 of driving events 178 of one embodiment of the present disclosure is illustrated. As discussed above, the UBI device 170 may be configured to output an audio and/or video alert responsive to detecting one or more of the driving events (a.k.a. triggers) 178 stored in a local storage has occurred via signals from the sensors 162 and/or ECUs 152. Alternatively, the computing platform 104 may be configured to output the alert in combination with or in lieu of the UBI device 170 responsive detecting the occurrence of one or more of the driving events 178 stored in the storage 106. The driving events 178 stored in the storage 106 and stored in the UBI device 170 may be independent from each other. Alternatively, the driving events 178 may be collectively stored in both the storage 106 and the UBI device 170 with or without overlapping events.

The driving event 178 may include any predefined event suggesting an potentially hazardous driving condition detected via the sensors 162 or ECUs 152 indicative of a situation in which an audio and/or video alert may be output to notify the vehicle driver advising to correct his/her driving behavior. As a few non-limiting examples, the driving events 178 may include a harsh-braking event 202 in which the deceleration detected via the g-sensor 162 exceeds a predefined threshold. Additionally or alternatively, the harsh-braking event 202 may be detected via the ESC controller 160 e.g. engaging ABS controls or the like. The driving events 178 may further include a hard-acceleration event 204 in which the acceleration detected by the g-sensor 162 and/or other ECUs 152 (e.g. PCM 156 detecting high RPM) exceeds a predefined threshold. The driving events 178 may further include a harsh cornering event 206 in which the cornering (e.g. the roll/yaw rates) of the vehicle 102 detected via the g-sensor 162 and/or an ECU 152 (e.g. the ESC 160) exceeds a predefined threshold. The driving events 178 may further include an oversteer/understeer event in which the computing platform 104 or the UBI device 170 detects the vehicle 102 oversteers/understeers via signals from a steering angle sensor 162 and/or an ECU 152 (e.g. the ESC 160) indicating such a vehicle maneuver. The driving events 178 may further include an excessive idling event 210 in which the vehicle idling detected via the sensors 162 and/or the PCM 156 exceeds a time threshold (e.g. 5 minutes). The driving events 178 may further include a lane changing too quickly event 212 in which the computing platform 104 and/or the UBI device 170 detects the vehicle 102 changes lanes too quickly using signals from the g-sensor 162 and or a camera 162 beyond a threshold. The driving events 178 may further include a high revolutions-per-minute (RPM) event 214 detected via signals from the ECUs 152 (e.g. the PCM 156) exceeding a threshold (e.g. 300 RPM). The driving events 178 may further include a door open while the vehicle transmission is not in Park event 216 in which the computing platform 104 or the UBI device 170 detects one or more vehicle doors is open while the transmission is not in the Park position (e.g. still in Drive mode) via ECUs 152 (e.g. the BCM 158 and the PCM 156). The driving events 178 may further include an excessive speeding event 217 in which the vehicle 102 is driving above the speed limit by one or more predefined thresholds (e.g. minor alerts for 10 mph or less above the speed limit, and major alerts for more than 10 mph above the speed limit) detected via the speed sensor 162, the GNSS 124 and/or the navigation controller 126.

Responsive to detecting one of the driving events 178, the computing platform 104 may output a predefined alert to the vehicle driver notifying the potential hazard of the driving event. Alternatively, the alert may be generated and output through the in-vehicle network 150 by the UBI device 170. Alternatively, the computing platform 104 and the UBI device 170 may be configured to collectively detect the driving event 178 and collectively control the alert output. The alert may include an audio alert, e.g. a chime, output via the speaker 122 by way of the audio controller 120, or a video alert, e.g. an icon/symbol, output via the display 116 by way of the video controller. The alert may further include a haptic alert via a device such as an electric vibrator (not shown) associated with a vehicle seat output by way of the BCM 158. Alternatively, the haptic alert may be further output via the mobile device connected to the computing platform 104 via the connection 184. Alternatively, the alert may include any combination of the above-mentioned types of output.

Figure 3:
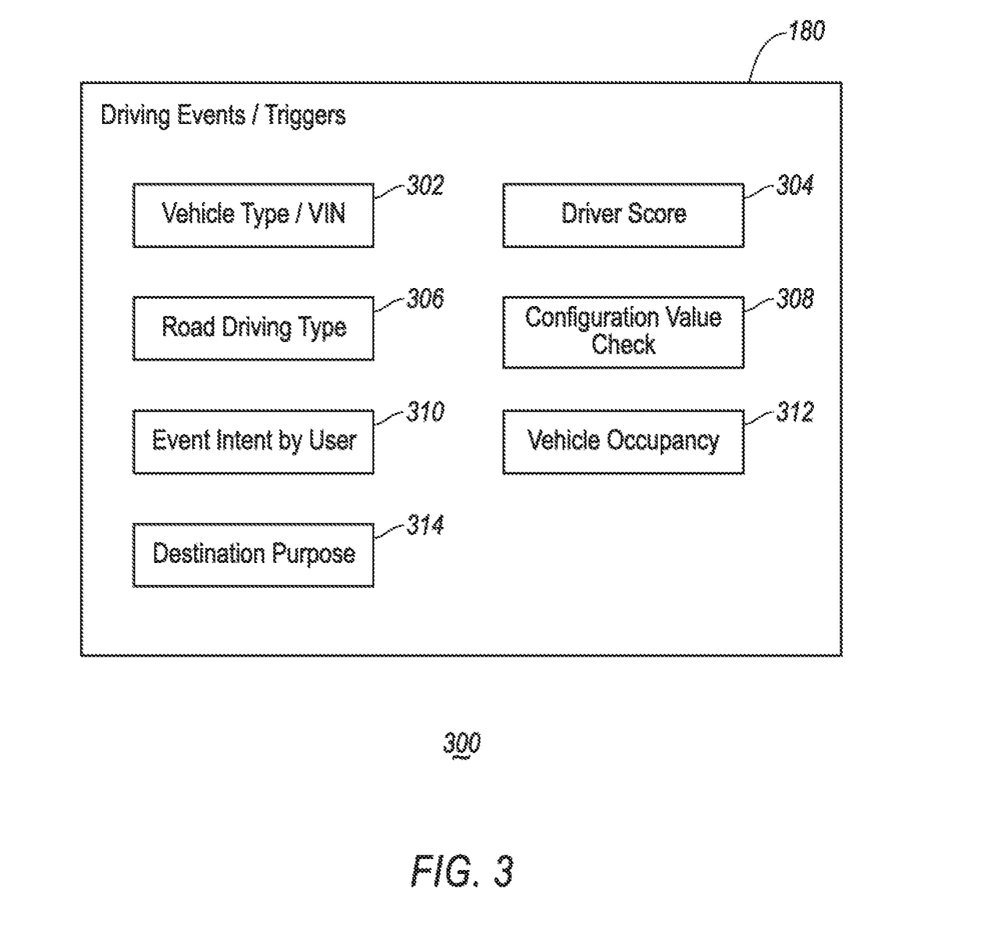
FIG. 3 illustrates an example diagram for a normalization checklist of one embodiment of the present disclosure.

To prevent oversensitive alerts from irritating the vehicle user, a normalization mode may be provided to adjust the alert threshold tailored for different users operating different vehicles. The normalization checklist 180 may be used to compare drivers, vehicles, and/or events to adjust the alert.

Referring to FIG. 3, an example diagram 300 for alert normalization checklist is illustrated. The normalization checklist 180 may be independently stored in the storage 106 and stored the UBI device 170. Alternatively, the normalization checklist 180 may be collectively stored in both the storage 106 and the UBI device 170 with or without overlapping entries. The normalization checklist 180 may include various entries related to the vehicle 102, the driver and/or the events 178 to adjust the alert. As a few non-limiting examples, the normalization checklist 180 may include a vehicle type entry 302 directed to identify the type and specification of the vehicle 102. For instance, the vehicle type entry 302 may include a vehicle identification number (VIN) of the vehicle 102 to identify the type and specification of the vehicle 102. The vehicle type entry 302 may further include information about any customization made to the vehicle 102 to further identify the specification. The customization may include tires, suspension, exhaust, engine tune-up or the like as a few non-limiting examples. Vehicles of different types (e.g. trucks and cars) may have different driving characteristics such as acceleration and braking. The same type of vehicles with different trim level, specification and/or customization (e.g. engine, transmission, and suspension) may still differ in terms of driving characteristics. Therefore, different threshold for driving events may be used for alert output purposes. As an example, the computing platform 104 and/or the UBI device 170 may be configured to reduce the alert sensitivity by increasing the threshold for the high RPM event 214 (e.g. to 4000 RPM) for sport vehicles as compared with the threshold for a four-door sedan (e.g. 3000 RPM) as sport vehicles are designed to operate at high RPMs. Similarly, vehicles with firmer suspension may be assigned with a reduced sensitivity for the harsh cornering event 206 as compared with vehicles with softer suspension.

The normalization checklist 180 may further include a driver score entry 304 directed to the driving record and driving pattern of the driver operating the vehicle 102. Drivers with good records may receive high scores and fewer alerts, whereas drivers with bad records may receive low scores and more alerts. In addition, different drivers may have different driving patterns/habits. For instance, some driver may habitually perform oversteer/understeer. Such driving pattern may be collected by the computing platform 104 and/or the UBI device 170. The driver may be scored by the computing platform 104 or the UBI device 170 using driving history/pattern data associated with each specific driver via the sensors 162 and/or the ECUs 152. Additionally or alternatively, the driver score and driving history may be shared across the fleet and download via the cloud 190. The normalization checklist 180 may further include a road driving type entry 306 directed to the road condition that vehicle 102 is currently traversing or anticipated to traverse using data from the GNSS controller 124 and/or the navigation controller 126. The road driving type entry 306 may further include weather and temperature information received from the cloud 190. The computing platform 104 and/or the UBI device 170 may be configured to increase the sensitivity by lowering the threshold of the alerts responsive to detecting bad or hazardous road condition e.g. snow, rain, or unpaved road.

The normalization checklist 180 may further include a configuration value check entry 308 directed to comparing various driving event alert thresholds with similar vehicles within similar locations defined by geofences, to determine of the current threshold is appropriate. The normalization checklist 180 may further include an event intent by user entry 310 collect vehicle data from various sensors 162 and ECUs 152 to determine the intent of the vehicle user during a driving event. For instance, the computing platform 104 or the UBI device 170 may detect a door open while not in Park event 216 when the vehicle 102 loading/unloading passengers in a designated loading area. In this case, the alert corresponding to the door open while not in Park event 216 may be reduced, delayed or cancelled because the specific event is intended by the vehicle driver.

The normalization checklist 180 may further include a vehicle occupancy entry 312 directed to the occupancy of the vehicle 102 detected via one or more in-cabin camera and/or seat sensors 162. The threshold for vehicle alerts may be adjusted based on the level of occupancy of the vehicle 102. For instance, the computing platform 104 and/or the UBI device 170 may increase the sensitivity by lowering the threshold of alerts for one or more driving event 178 (e.g. excessive speeding 217) responsive to detecting the vehicle 102 is highly occupied e.g. there are multiple passengers in the vehicle 102. The normalization checklist 180 may further include a destination purpose entry 180 directed to adjust the alert sensitivity based on the destination purpose and trip types. For instance, responsive to detecting the destination for a trip is a hospital suggesting the possible emergency nature of the trip, the computing platform 104 or the UBI device 170 may reduce the sensitivity of various alerts by rising the thresholds, as compared with a trip delivery a passenger to a workplace or delivering goods.

Each driving event 178 may be associated with one or more entries on the normalization checklist 180 that is related to the driving event 178 under a predefined configuration. For instance, the harsh braking event 202 may be associated with the vehicle type entry 302, the driver score entry 304, the road driving type entry 306, the configuration value check entry 308, the event intent by user entry 310, and the vehicle occupancy entry 312. The harsh acceleration event 204 may be associated with the vehicle type entry 302, the driver score entry 304, the road driving type entry 306, the configuration value check entry 308, the event intent by user entry 310, and the vehicle occupancy entry 312. The harsh cornering event 206 may be associated with the vehicle type entry 302, the driver score entry 304, the road driving type entry 306, the configuration value check entry 308, and the vehicle occupancy entry 312. The oversteer/ understeer event 308 may be associated with the vehicle type entry 302, the driver score entry 304, and the road driving type entry 306. The excessive idling event 210 may be associated with the event intent by user entry 310 and the destination purpose entry 314. The changing lances too quickly event 212 may be associated with the vehicle type entry 302, driver score entry 304, configuration value check entry 308, the event intent by user entry 310, and the vehicle occupancy entry 312. The high RPM event may be associated with the vehicle type entry 302. The door open while not in Park event 216 may be associate with the event intent by user entry 310, the vehicle occupancy 312, and the destination purpose entry 314. The excessive speeding event may be associated with the driver score entry 304, the road driving type entry 306, the configuration value check entry 308, and the vehicle occupancy entry 312. It is noted that the above associations are merely examples and other associations and/or connections between the driving events 178 and the normalization checklist may be used depending on the specific configuration of the vehicle 102.

Figure 4:
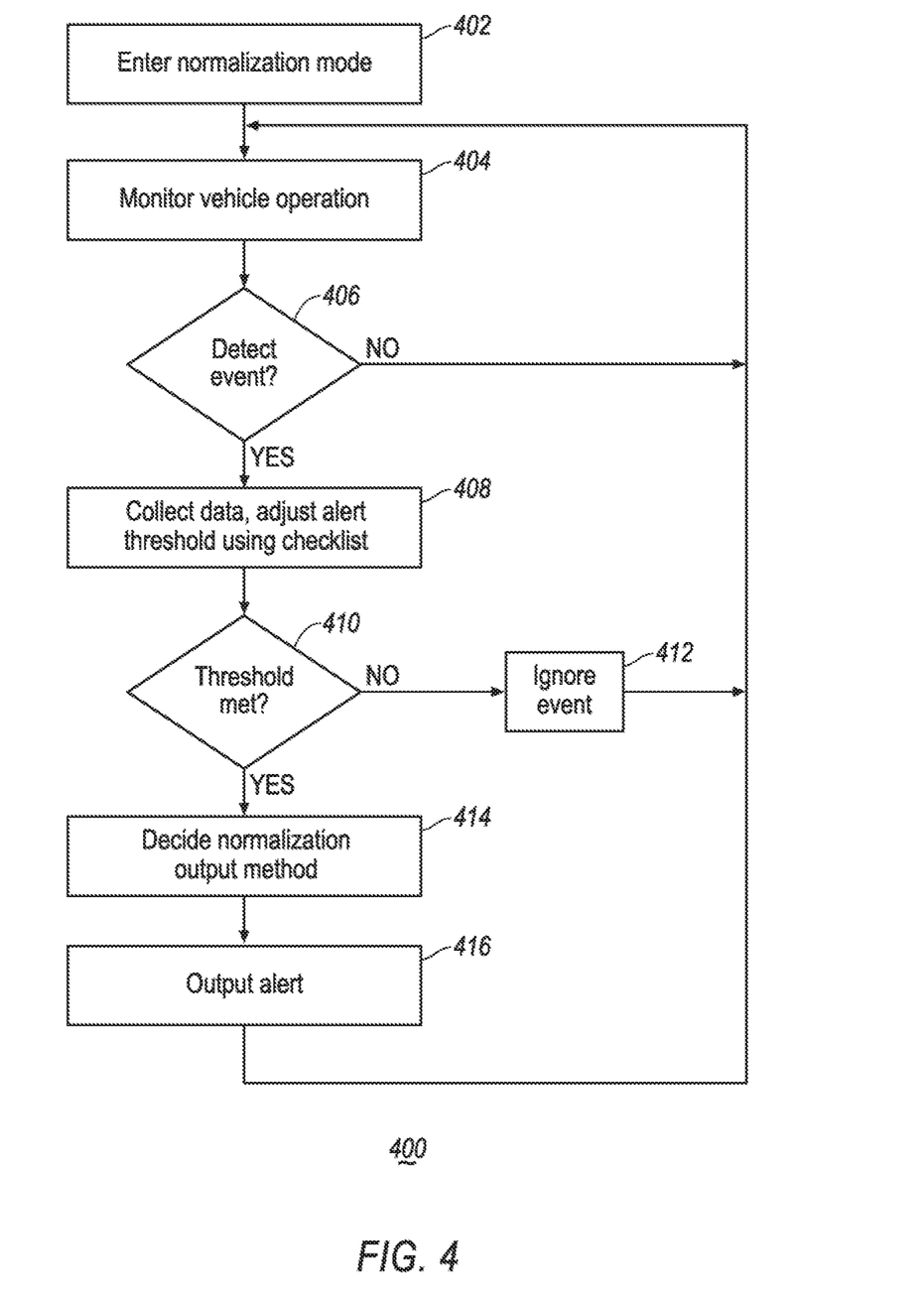
FIG. 4 illustrates an example flow diagram for a process of one embodiment of the present disclosure.

Referring to FIG. 4, an example diagram for a process 400 of one embodiment of the present disclosure is illustrated. The process 400 may be independently or collectively implemented via the computing platform 104 or via the UBI device 170. For the simplicity of the illustration, the process 400 will be implemented via the computing platform 104 in description below. To further simplify the description, both the driving events 178 and the normalization checklist 180 will be stored in the storage 106 of the computing platform 104 in the following description, although the driving events 178 and the normalization checklist 180 may be stored elsewhere e.g. in the UBI device 170.

At operation 402, the computing platform 104 enters into the normalization alert mode responsive to a user input e.g. via the HMI controller 118. Alternatively, the computing platform 104 may be configured to automatically enter into the normalization mode by default. At operation 404, the computing platform 104 monitors the operation of the vehicle 102 using data received from various sensors 162 and/or ECUs 152 through the in-vehicle network 150. The computing platform 104 processes the data to compare against the driving events 178 stored in the storage 106 and/or the UBI device 170 to detect one or more matching driving events 178. If no matching event 178 is detected, the process returns from operation 406 to operation 404 to continue monitoring the vehicle operation. Otherwise, responsive to detecting a matching driving event 178, the process proceeds to operation 408.

At operation 408, the computing platform 104 normalizes the alert for the matching driving event 178 by adjusting the threshold based on the normalization checklist 180 using data collected from various sensors 162 and/or ECUs 152. The computing platform 104 may be configured to only use the entries on the normalization checklist 180 that are associated with the detected matching event to normalize the alert output. For instance, in case that a harsh braking 202 is detected, the computing platform 104 may use one or more of the vehicle type entry 302, the driver score entry 304, the road driving type entry 306, the configuration value check entry 308 and the vehicle occupancy entry 312, which are associated the harsh braking event 202 to collectively adjust/normalize the alert output and adjust the alert threshold. Responsive to adjusting the threshold for alert, at operation 410, the computing platform 104 checks if the currently detected matching event meets the adjusted threshold. If the answer is a no, the process proceeds to operation 412 and the computing platform 104 ignores the event without outputting any alert. Otherwise, the process proceeds to operation 414 and the computing platform 104 decides an output method for the alert in the normalization mode. One driving event 178 may correspond to multiple alert outputs. Multiple alert output methods may be used corresponding to multiple level of detection based on different threshold. Taking the excessive speeding event 217 for instance, the computing platform 104 may be configured to output an audio alert via the speaker 122 when a minor speeding (e.g. within 10 mph above the speed limit) is detected. The computing platform 104 may be further configured to output a visual alert via the display 116 along with the audio alert responsive to detect a major speeding (e.g. for more than 10 mph above the speed limit). Due to the normalization performed by the computing platform, the threshold separating the minor speeding and major speeding may be adjusted. For instance, responsive to detecting the configuration value check entry 308 suggesting many other vehicles travels at high speed on the same route as the vehicle 102 is traversing, the computing platform 104 rise both the minor speeding threshold and the major speeding threshold for the excessive speeding event 217. Therefore, the computing platform 104 further decides the alert output method based on the adjusted thresholds at operation 414, and output the alert based on the decision at operation 416. The process returns to operation 404 to repeat the operations.

Figure 5:
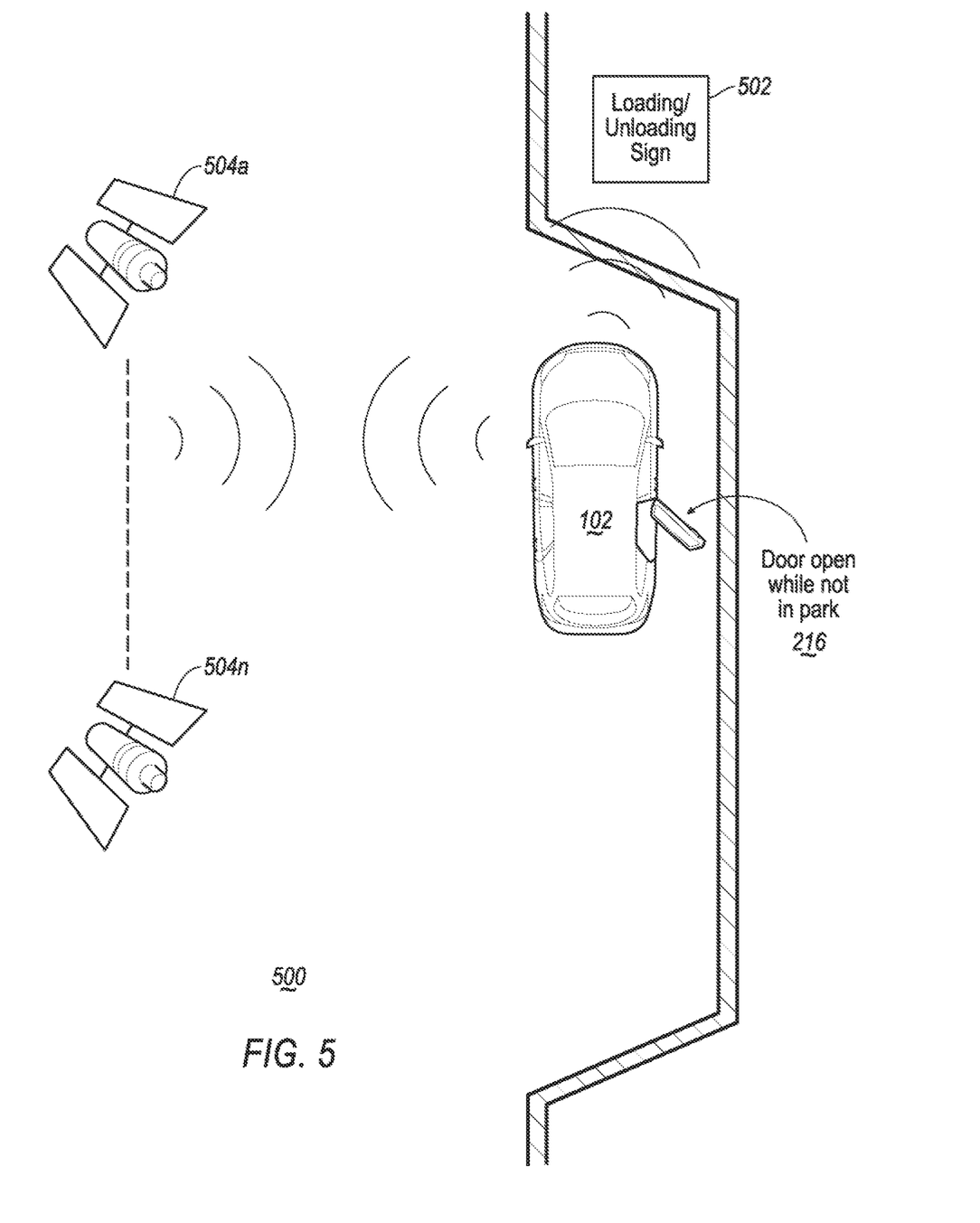
FIG. 5 illustrates an example diagram of one embodiment of the present disclosure.

The operations of the process 400 may be applied to various situations. Referring to FIG. 5, an example diagram of one embodiment of the present disclosure is illustrated. In the present example, the computing platform 104 may detect a door open while the vehicle 102 is no in Park event 216. Responsive to detecting such an event, the computing platform 104 may normalize the alert corresponding to the event 216 based on entries on the normalization checklist 180. In the present example, the door open while not in park may be associated with the event intent by user entry 310, the vehicle occupancy entry 312, and the destination purpose entry 314. When the event occurs, the vehicle 102 may be at a loading/unloading area instructed by a loading/unloading sign 502 within the capture range of the camera 162. The loading unloading sign may be a bus/shuttle sign, a taxi sign or any sign/symbol indicating vehicles may stop for loading and unloading purposes. The camera 162 may capture the sign for the event intent by user entry 310 and the destination purpose entry 314. Additionally or alternatively, the computing platform 104 may be configured to further determine/verify the event intent by user entry 310 and the destination purpose entry 314 via the current location of the vehicle 102 detected via the GNSS controller 124 communicating with multiple satellites 504a . . . 504n. The location data may be used by the navigation controller 126 combined with the map data store in the storage 106 as a part of the vehicle data 110 to determine the vehicle 102 is currently within a geofence designated to be used as a loading/unloading area, which verifies the event intent by user entry 310 and the destination purpose entry 314. Additionally, the vehicle sensors 162 may detect a vehicle occupancy change further suggesting the vehicle is loading/unloading based on the vehicle occupancy entry 312. Using the above entries associated with the door open while not in Park event 216, the computing platform 104 may normalize the alert for the event by rising the threshold. As a result, the alert output may be reduced, delayed, or not even produced.

Figure 6:
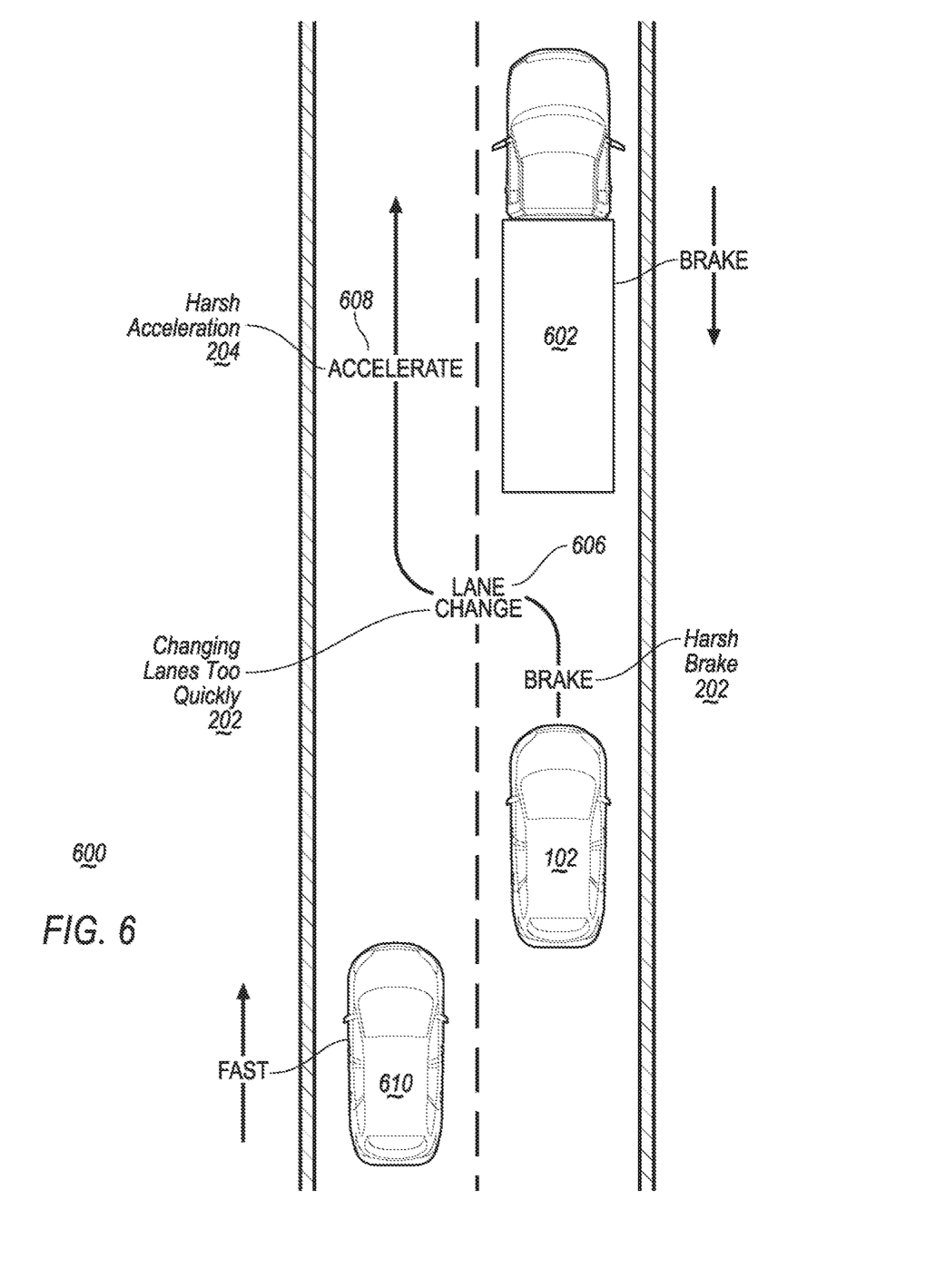
FIG. 6 illustrates an example diagram of another embodiment of the present disclosure.

Referring to FIG. 6, an example diagram of another embodiment of the present disclosure is illustrated. In the present example, a semi-truck 602 in front of the vehicle 102 brakes harshly. To avoid an accident, the vehicle 102 brakes harshly 604, veers to the left lane 606, and accelerates harshly 608 to match the speed of the vehicle 610 approaching front the behind at a high rate of speed. The maneuver may result in one or more driving events 178. For instance, the computing platform 104 of the vehicle 102 may detect a harsh brake event 202 corresponding to the braking 604, a changing lanes too quickly event 312 corresponding to the lane changing 606, and a harsh acceleration event 204 corresponding to the acceleration 608. The normalization process may detect the emergency nature of the maneuver via the event intent by user entry 310 from signals received from various sensors 162. For instance, the computing platform 104 may detect the sudden deceleration of the truck 602 in front of the vehicle 102 and the fast approach of the vehicle 610 from the behind via cameras or proximity sensors 162, and therefore determine the driver engaged in the emergency maneuver to avoid an accident. Couple with other entries such as the vehicle type entry 302, the driver score entry 304, the road driving type entry 306, and/or the configuration value check entry 308, the computing platform 104 may reduce the sensitivity of the alert associated with the driving events 178 detected by rising the threshold to not disturb the driver.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
   a controller programmed to calculate a configuration value check entry using data received from fleet vehicles located within a geofence associated with the vehicle;
   responsive to detecting a predefined event indicative of a hazardous condition, adjust a threshold for an alert corresponding to the event based on one or more entries including the configuration value check entry, related to an operation of the vehicle and associated with the event; and
   responsive to adjusting the threshold, output the alert in a method corresponding to the threshold as adjusted;
   wherein the one or more entries further include at least one of a driver score entry, or an event intent by user entry.

2. The vehicle of claim 1, wherein the one or more entries further include at least one of: a vehicle type entry, a driver score entry, a road driving type entry, an event intent by user entry, a vehicle occupancy entry, or a destination purpose entry.

3. The vehicle of claim 2, wherein the controller is further programmed to calculate the driver score entry via data collected from one or more sensors or one or more vehicle electronic control units (ECUs) using predefined algorithm.

4. The vehicle of claim 2, wherein the controller is further programmed to
   upload the driver score entry for a driver to a cloud via a telematics control unit (TCU); and
   download the driver score entry for the driver from a cloud via a mobile device.

5. The vehicle of claim 2, wherein the controller is further programmed to verify the event intent by user entry via an image data captured by a camera.

6. The vehicle of claim 5, wherein the image data captured by the camera involves a sign with predefined meaning recognizable by the controller.

7. The vehicle of claim 2, wherein the controller is further programmed to
   detect the destination purpose entry using location data received from global navigation satellite system (GNSS) controller.

8. The vehicle of claim 1, wherein the event includes at least one of: a harsh braking event, a harsh acceleration event, a harsh cornering event, an oversteer event, an understeer event, an excessive idling event, a changing lanes too quickly event, a high revolution-per-minute (RPM) event, a door open while not in Park event, or an excessive speeding event.

9. The vehicle of claim 8, wherein each event is associate with one or more entries under a predefined configuration.

10. A device, connected to a network of a vehicle, comprising:
    a processor, programmed to
    calculate a configuration value check entry using data received from fleet vehicles located within a geofence associated with the vehicle;
    responsive to detecting a predefined event indicative of a hazardous condition via a signal received from the network, adjust a threshold for an alert corresponding to the event based on one or more entries including the configuration value check entry, related to an operation of the vehicle and associated with the event; and
    responsive to adjusting the threshold, output the alert in a method corresponding to the threshold as adjusted,
    wherein the one or more entries further include at least one of a driver score entry, or an event intent by user entry.

11. The device of claim 10, wherein the processor is further programmed to calculate the driver score entry via data collected from one or more sensors or one or more vehicle ECUs using predefined algorithm.

12. The device of claim 10, wherein the processor is further programmed to
    verify the event intent by user entry via an image data captured by a camera indicative of a sign with predefined meaning recognizable by the processor.

13. The device of claim 10, wherein the processor is further programmed to
    upload the driver score entry for a driver to a cloud via a TCU; and
    download the driver score entry for the driver from a cloud via a mobile device.

14. The device of claim 10, wherein the one or more entries further include at least one of: a vehicle type entry, a road driving type entry, a vehicle occupancy entry, or a destination purpose entry.

15. The device of claim 14, wherein the processor is further programmed to
    detect the destination purpose entry using location data received from global navigation satellite system (GNSS) controller.

16. The device of claim 10, wherein the event includes at least one of: a harsh braking event, a harsh acceleration event, a harsh cornering event, an oversteer event, an understeer event, an excessive idling event, a changing lanes too quickly event, a high revolution-per-minute (RPM) event, a door open while not in Park event, or an excessive speeding event.

17. A method for a vehicle, comprising:
    calculate a configuration value check entry using data received from fleet vehicles located within a geofence associated with the vehicle;
    detecting a predefined event indicative of a hazardous condition via a signal received from one or more vehicle sensors;
    adjusting a threshold for an alert corresponding to the event based on one or more entries including the configuration value check entry, related to an operation of the vehicle and associated with the event; and
    outputting the alert in a method corresponding to the threshold as adjusted,
    wherein the one or more entries further include at least one of: a vehicle type entry, a driver score entry, a road driving type entry, an event intent by user entry, a vehicle occupancy entry, or a destination purpose entry.

18. The method of claim 17, wherein the event includes at least one of: a harsh braking event, a harsh acceleration event, a harsh cornering event, an oversteer event, an understeer event, an excessive idling event, a changing lanes too quickly event, a high revolution-per-minute (RPM) event, a door open while not in Park event, or an excessive speeding event.

* * * * *